(12) United States Patent
Goose et al.

(10) Patent No.: US 11,724,627 B2
(45) Date of Patent: Aug. 15, 2023

(54) FLEXIBLE TANK WITH CAPE, DISCHARGE APPARATUS AND METHOD

(71) Applicant: Odyssey Logistics & Technology Corporation, Danbury, CT (US)

(72) Inventors: Roger Goose, Horseshoe Bay, TX (US); Douglas Postek, Katy, TX (US)

(73) Assignee: Odyssey Logistics & Technology Corporation, Danbury, CT (US)

( * ) Notice: Subject to any disclaimer, the term of this patent is extended or adjusted under 35 U.S.C. 154(b) by 879 days.

(21) Appl. No.: 16/464,659

(22) PCT Filed: Nov. 24, 2017

(86) PCT No.: PCT/US2017/063198
§ 371 (c)(1),
(2) Date: Aug. 8, 2019

(87) PCT Pub. No.: WO2018/098403
PCT Pub. Date: May 31, 2018

(65) Prior Publication Data
US 2019/0389717 A1    Dec. 26, 2019

Related U.S. Application Data

(60) Provisional application No. 62/426,426, filed on Nov. 25, 2016.

(51) Int. Cl.
*B67D 7/02* (2010.01)
*B65D 88/22* (2006.01)
(Continued)

(52) U.S. Cl.
CPC ............ *B60N 2/60* (2013.01); *B60N 2/2881* (2013.01); *B60N 2/6018* (2013.01);
(Continued)

(58) Field of Classification Search
CPC ...... B60N 2/60; B60N 2/2881; B60N 2/6018; B60N 2/6027; B60N 2/6036;
(Continued)

(56) References Cited

U.S. PATENT DOCUMENTS

| 2,620,120 A | * | 12/1952 | Andersen | ............... B65D 33/22 383/22 |
| 3,095,206 A | * | 6/1963 | Fresia | ..................... B60P 3/426 222/608 |

(Continued)

*Primary Examiner* — Frederick C Nicolas
(74) *Attorney, Agent, or Firm* — Bauer Law Offices; Robert M. Bauer

(57) ABSTRACT

A flexible tank is used to transport bulk liquids or semi-liquid materials inside of a multi-modal shipping container. It has water proof inner layers and an outer layer, which are formed and welded together to have seams at both ends of the flexible tank. A discharge valve is provided at one end of the flexible tank and an additional piece of material, referred to as a cape, is attached at the other end of the flexible tank. The flexible tank is situated in the container so that the end with the discharge valve is at the container opening and the end with the attached cape is at the rear of the container. The cape can be used by equipment positionable at the opening of the container to completely discharge the bulk liquids or semi-liquid materials from the flexible tank by pulling and winding up the cape and the layers of the flexible tank from the rear of the container.

20 Claims, 10 Drawing Sheets

(51) Int. Cl.
  *B65D 88/54* (2006.01)
  *B65D 90/20* (2006.01)
  *B60P 1/64* (2006.01)
  *B60N 2/60* (2006.01)
  *B60N 2/28* (2006.01)
  *B60N 3/10* (2006.01)
  *B65D 88/58* (2006.01)
  *B60P 3/22* (2006.01)
  *B65D 90/04* (2006.01)
  *B65D 88/62* (2006.01)

(52) U.S. Cl.
  CPC ......... *B60N 2/6027* (2013.01); *B60N 2/6036* (2013.01); *B60N 2/6054* (2013.01); *B60N 3/10* (2013.01); *B60P 3/2205* (2013.01); *B65D 88/22* (2013.01); *B65D 88/54* (2013.01); *B65D 88/58* (2013.01); *B65D 88/62* (2013.01); *B65D 90/047* (2013.01); *B65D 90/20* (2013.01); *B67D 7/0216* (2013.01); *B60N 2/28* (2013.01); *B60P 3/225* (2013.01); *B60P 3/2265* (2013.01); *B65D 2590/046* (2013.01)

(58) Field of Classification Search
  CPC .......... B60N 2/6054; B60N 3/10; B60N 2/28; B65D 88/22; B65D 88/54; B65D 90/20; B65D 88/62; B65D 2590/046; B65D 88/58; B65D 90/047; B67D 7/0216; B60P 3/225; B60P 3/2265; B60P 3/2205
  See application file for complete search history.

(56) References Cited

U.S. PATENT DOCUMENTS

| | | | | |
|---|---|---|---|---|
| 3,343,719 A * | 9/1967 | Kastamo | ............ | B65D 75/5877 D9/527 |
| 3,437,117 A * | 4/1969 | Vitello | ................... | B65D 33/14 383/14 |
| 4,124,136 A * | 11/1978 | Bjelland | .............. | B65D 90/047 160/370.1 |
| 4,132,310 A * | 1/1979 | Dorsch | ..................... | B60P 7/12 206/386 |
| 4,212,405 A * | 7/1980 | Schmidt | ............... | B62D 29/008 296/182.1 |
| 4,277,220 A * | 7/1981 | Wiley | .................... | B60P 1/006 414/539 |
| 4,379,453 A * | 4/1983 | Baron | ........................ | B01J 7/02 604/145 |
| 4,541,765 A * | 9/1985 | Moore | ................... | B65D 88/62 222/105 |
| 4,854,801 A * | 8/1989 | Bonerb | ..................... | B60P 1/56 414/469 |
| 4,909,156 A * | 3/1990 | Erickson | ................... | B61D 5/00 383/902 |
| 4,998,991 A * | 3/1991 | Poulton | ................ | B65D 90/205 248/579 |
| 5,188,460 A * | 2/1993 | Dorse | .................. | B65D 90/048 383/125 |
| 5,222,621 A * | 6/1993 | Matias | ................. | B65D 90/048 220/1.5 |
| 5,421,476 A * | 6/1995 | Matias | ................. | B65D 90/048 220/495.08 |
| 5,657,896 A * | 8/1997 | Matias | ................. | B65D 90/048 220/495.1 |
| 5,765,723 A * | 6/1998 | Wilcox | ................... | B65D 77/06 222/100 |
| 5,829,637 A * | 11/1998 | Takemura | ............ | B65D 77/065 222/105 |
| 6,481,598 B1 * | 11/2002 | Thomsen | ............. | B65D 90/048 222/105 |
| 7,073,676 B1 * | 7/2006 | Town | ..................... | B61D 49/00 220/1.6 |
| 7,080,758 B2 * | 7/2006 | Jones | ................. | B65D 83/0077 222/105 |
| 7,717,296 B1 * | 5/2010 | Guthrie | .................. | B65D 90/00 222/105 |
| 7,721,759 B2 * | 5/2010 | Naidu | ................ | B65D 75/5877 222/105 |
| 8,562,212 B1 * | 10/2013 | Strickland | ............ | B65D 88/123 383/61.3 |
| 10,137,809 B2 * | 11/2018 | Postek | .................. | B60P 3/2205 |
| 2005/0220369 A1 * | 10/2005 | Sullivan | ............... | B65D 75/563 383/14 |
| 2009/0045202 A1 * | 2/2009 | Kelly | ..................... | B65D 88/22 493/267 |
| 2009/0277900 A1 * | 11/2009 | Howison | .............. | B65D 90/205 220/1.6 |
| 2010/0032053 A1 * | 2/2010 | Chong | ................. | B65D 90/046 141/10 |
| 2011/0083768 A1 * | 4/2011 | Sims | .................... | B65D 90/047 141/2 |
| 2012/0132650 A1 * | 5/2012 | Buonerba | .......... | B65D 88/1606 220/1.6 |
| 2014/0133951 A1 * | 5/2014 | Thomas | ................. | B65D 88/22 414/800 |
| 2014/0251989 A1 * | 9/2014 | Clive-Smith | .......... | B65D 88/02 220/1.6 |

* cited by examiner

FLEXIBLE TANK WITH CAPE, DISCHARGE APPARATUS AND METHOD

This application claims priority to U.S. Provisional Patent Application No. 62/426,426 filed on Nov. 25, 2016, the contents of which are hereby incorporated by reference in their entirety.

BACKGROUND

A flexible tank can be used for the transportation of non-hazardous bulk liquids or semi-liquid materials inside of shipping containers, such as the standardized containers used in multimodal international shipping. Standardized shipping containers all have the same width and are typically 20 feet, 40 feet or 53 feet in length, with two doors at one end thereof to insert and remove cargo. When a flexible tank is used in a standard shipping container, it typically extends the entire length of the container and contains a large amount of material. Volumetrically, flexible tanks can range from several thousand liters up to 26,000 liters depending on the bulk density of the liquid. There may be heaters and insulation when food grade products or other products having temperature range are shipped. A sturdy bulkhead, such as one made of steel, is placed at the end of the container with the doors to keep the flexible tank in place when the doors are opened.

Typically, a flexible tank has multiple (such as 2-4) polyethylene (PE) inner layers. The material is preferably a Low Linear Density Polyethylene (LLDPE), and the inner layers may or may not have a variety of thicknesses. Each inner layer of the tank is heat sealed together leaving a "coupon" on each end to which an outer strengthening layer or shell of woven polypropylene (WPP) with a weight between 180 g/m2 to 210 g/m2 is stitched using an Overlock stitch, normally referred to as butt-seaming. Single layer Low Linear Density Polyethylene (LLDPE) flexible tanks are also known. They on average have a standard thickness of 1000 microns and do not require WPP outer strengthening layer. Whether it is a single layer or a multi-layer tank, both the inner and outer layers start out as tubular material.

A load/discharge valve is normally positioned at the bottom rear end of the tank facing through the bulkhead and is supported by a molded "gland" that is heat sealed into the body of the flexible tank. The gland is manufactured with a center threaded collar into which the valve is screwed completely and mechanically secured. The discharge valve and the hole in the bulkhead providing access to the discharge valve are located opposite the approximate center of a door of the container so that only that one door has to be opened to access the discharge valve with a pump to fill or remove the material. The flexible tank can be used to transport non-hazardous chemicals such as but not limited to base oils, castor oil, motor oil, paints and latex. With an appropriate inner liner, the flexible tank can be used to transport a variety of bulk liquid food grade products, including but not limited to, juice, juice concentrate, beer, wine, sucrose, glucose, glycerin, water, corn oil and other vegetable oils, choline chloride, honey, corn syrup or molasses. Typically, a flexible tank is used only once in sterile condition and is disposed of rather than cleaned.

The complete discharge of a flexible tank can be somewhat difficult. The inner layers may collapse trapping materials in pockets or folds at a considerable distance from the discharge valve and towards the end of the discharge process, the pump tends to suck the inner layers into the valve in any event. People may enter the container and attempt to maneuver the tank in such a way that will push the remaining product to be funneled to the discharge valve. This involves picking up the flexible tank with laden product, folding or rolling it up, and in some cases using brooms by starting at the rear of the tank and working the product forward to the discharge valve. At the same time, the pump has to be manipulated to reduce the possibility of the polyethylene layer of the flexible tank from being sucked into the discharge hose by the negative pressure the pump is producing while pumping the product out of the tank. This is a time consuming operation and normally requires at least two people. There can also be safety concerns for the people located inside the container with a flexible tank that has been only partially emptied.

When handling more viscous products, such as orange juice concentrate, the discharge process becomes more difficult and will leave substantially more residual product as opposed to a free flowing product such as water. Methods such as introducing water into the tank to dilute and liquefy the residual orange juice concentrate or other product have proven to be unsuitable. A water rinse is difficult to perform inside the flexible tank. And the process to collect the diluted residue in drums and run the residue through an evaporator to remove the water (returning the product to concentrate) is cumbersome and expensive.

BRIEF SUMMARY

It is a major objective to provide a flexible tank and equipment that facilitates the complete discharge of material from the flexible tank without significant manual labor. While particularly suited for sticky and gooey bulk products, such as orange juice concentrate, or low viscosity liquids, the system can also be used for free flowing liquids as well.

BRIEF DESCRIPTION OF THE DRAWINGS

FIG. 4b is a top view of the empty flexitank with cape shown in FIG. 4a.

FIG. 4c is a bottom perspective view of the empty flexitank with cape shown in FIG. 4a.

DETAILED DESCRIPTION OF THE PREFERRED EMBODIMENTS

Figure 1:
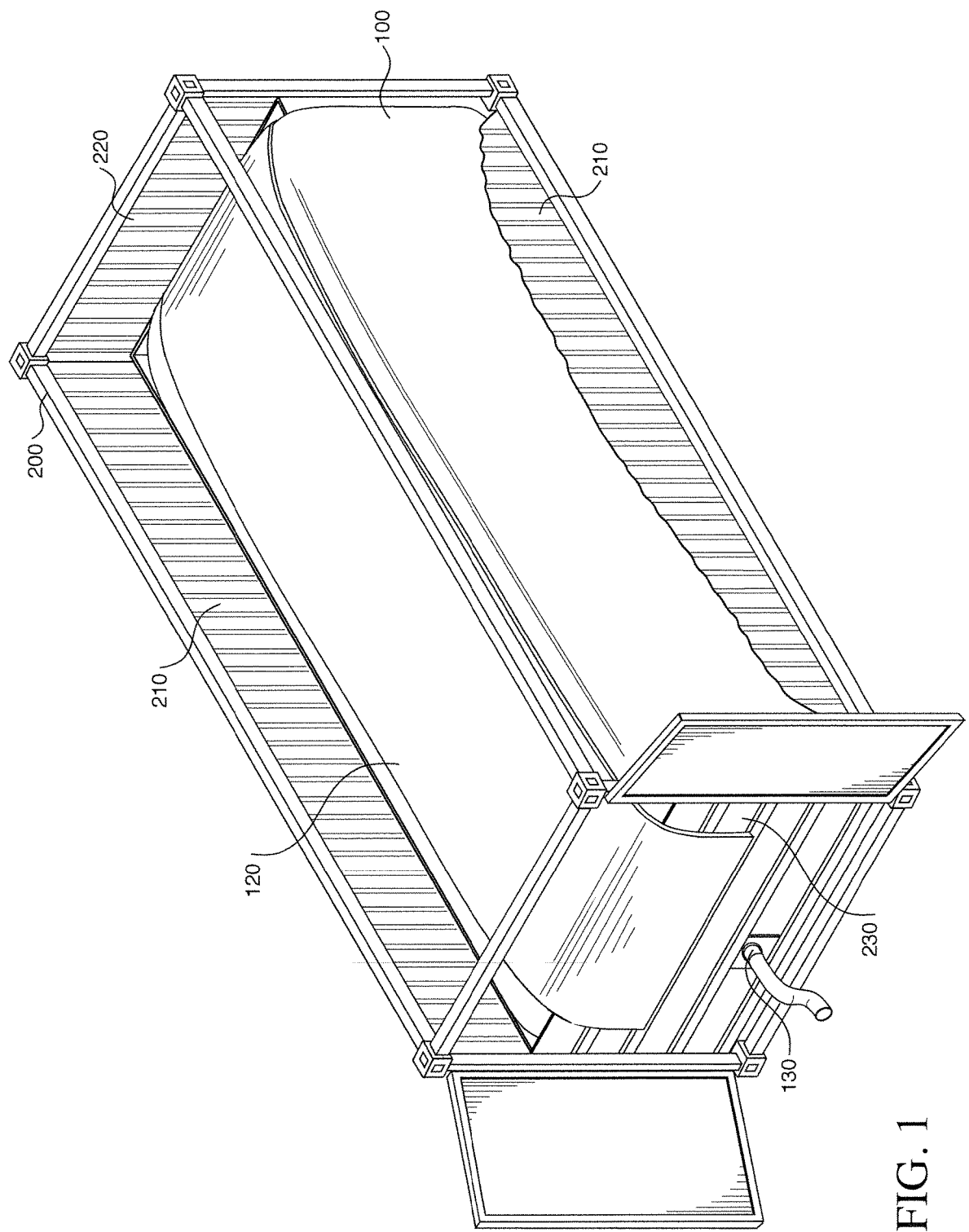
FIG. 1 is a front perspective view of a filled flexitank with cape according to a preferred embodiment of the invention inside of a shipping container.
Figure 2:
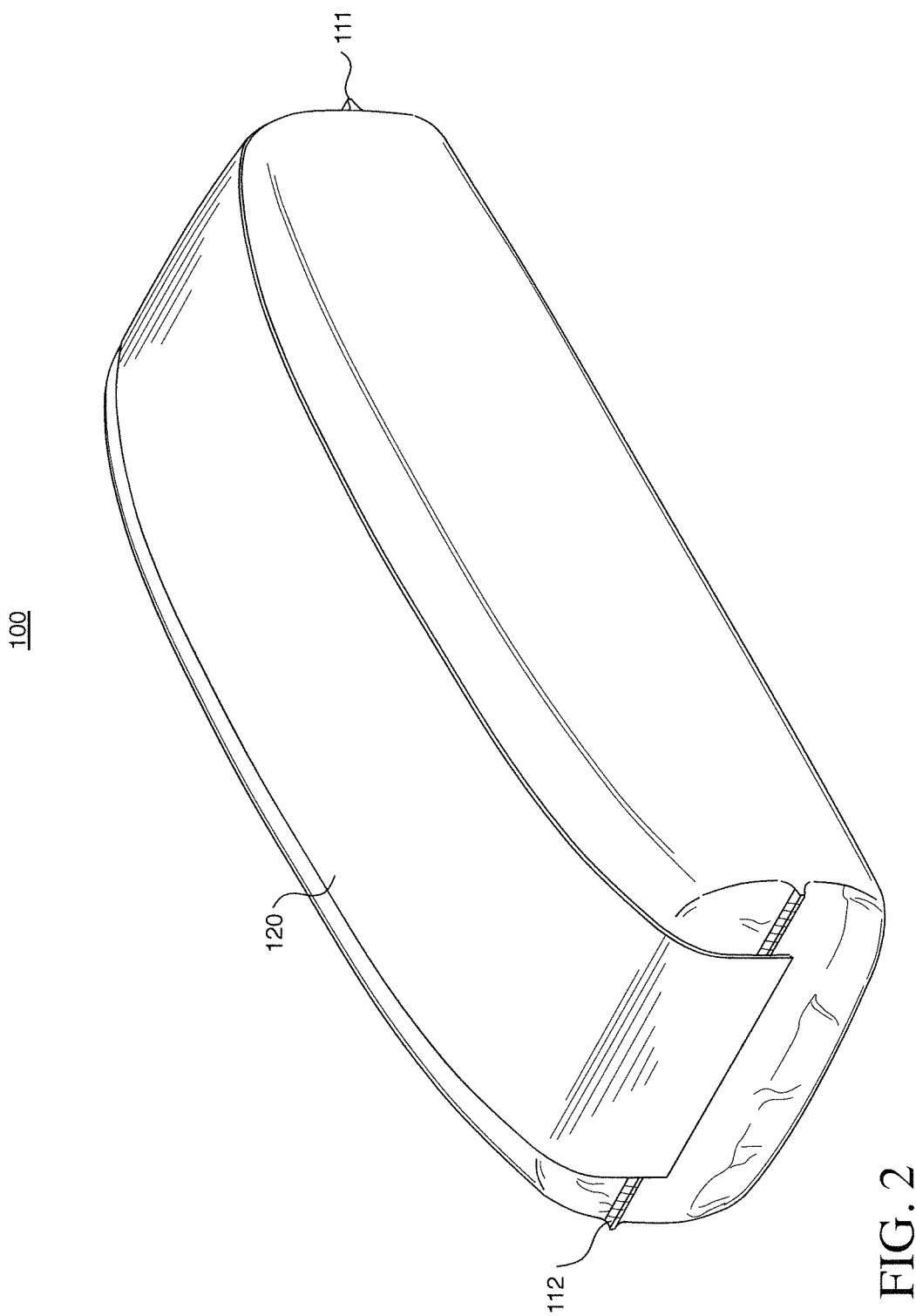
FIG. 2 is a front perspective view of the flexitank with cape shown in FIG. 1, with the container removed for clarity.
Figure 3:
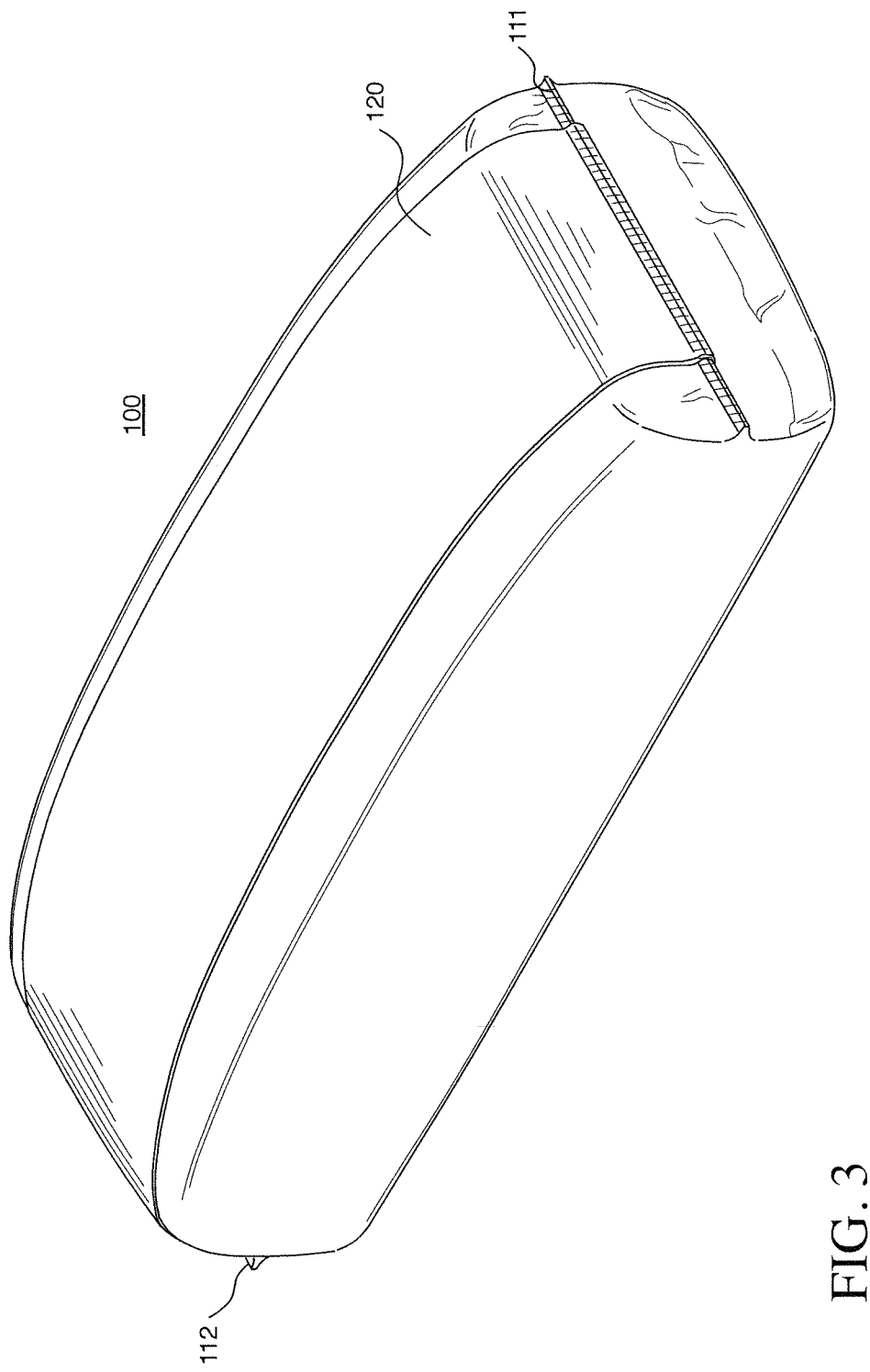
FIG. 3 is a rear side perspective view of the flexitank with cape shown in FIG. 1.

A new and improved flexible tank (sometimes shortened to "flexitank") 100 according to the preferred embodiments is shown in FIGS. 1-4d. It has low linear density polyethylene (LLDPE) inner layers, and an outer woven polypropylene (WPP) strengthening layer. The inner layers start out as generally tubular material and are heat sealed (welded) together to create a liquid tight construction at the ends of the tubed material. The outer strengthening layer of WPP is stitched onto the inner LLDPE liners excess material beyond the weld (coupon) at both ends of flexible tank 100 using an overlock stitch, resulting in closures, normally referred to as butt-seams 110 and 111. An additional piece of material, called a "cape" since it is vaguely reminiscent of Superman's cape, has one end attached at or near the end butt seam 111 of the outer layer that is opposite the end of the flexible tank with the discharge valve 130. As shown in FIGS. 1-3, cape 120 simply rests on top of flexitank 100 during transport inside a container. (Although the container is not shown in FIGS. 2 and 3, the sides and ends of flexitank 100 are shown as substantially vertical since during transport they are supported by the side walls 210, end wall 220 and bulkhead 230 of the container 200.)

The cape 120 is preferably attached by incorporating it and sewing it into the seam of the outer strengthening layer that is attached to the end coupon. But it can be attached in a number of different ways, such as glueing, grommets, rivets, or any other manner of attachment, especially when retrofitting a flexible tank (that already has the inner layers and outer layer stitched together) to have an extractor cape 120. Whatever the method or type of attachment, it should have sufficient strength to survive the pulling action described herein when discharging the flexitank 100.

Figure 4A:
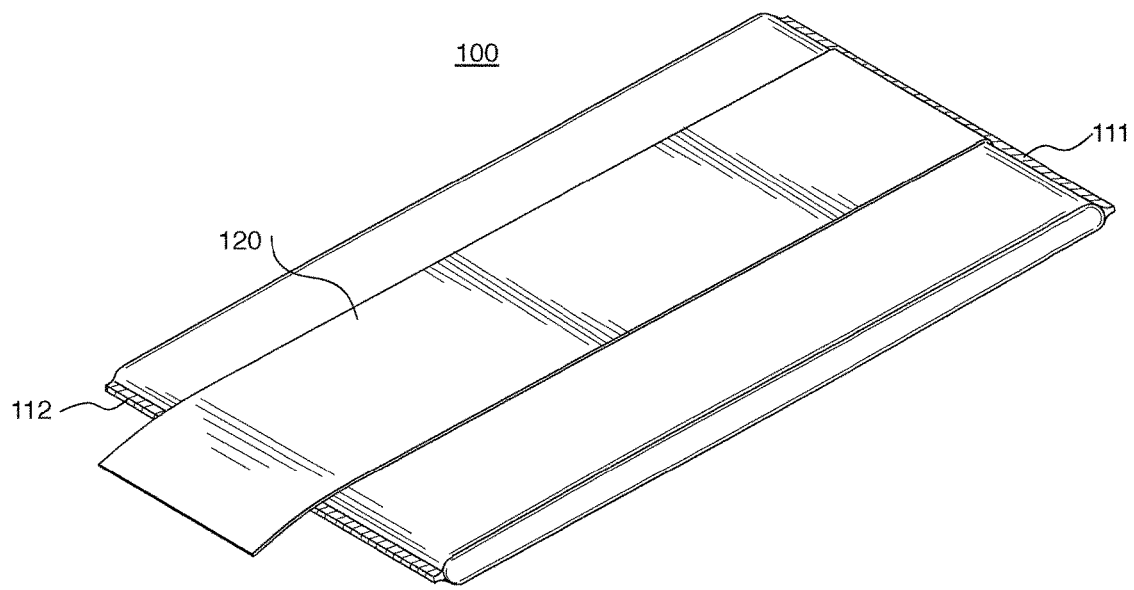
FIG. 4a is a front perspective view of an empty flexitank with cape according to a preferred embodiment of the invention.
Figure 4B:
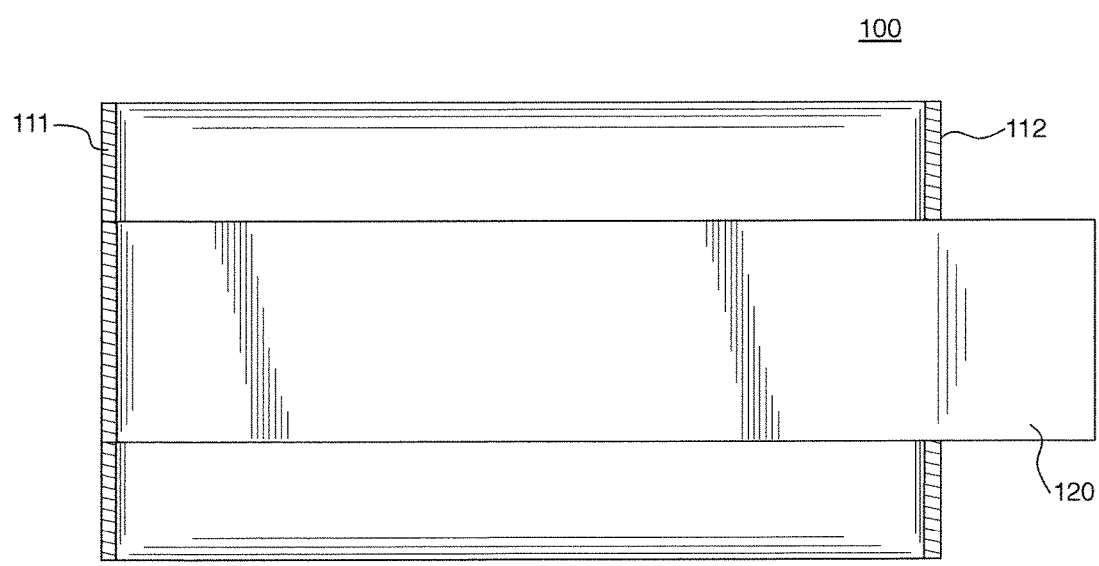
Figure 4C:
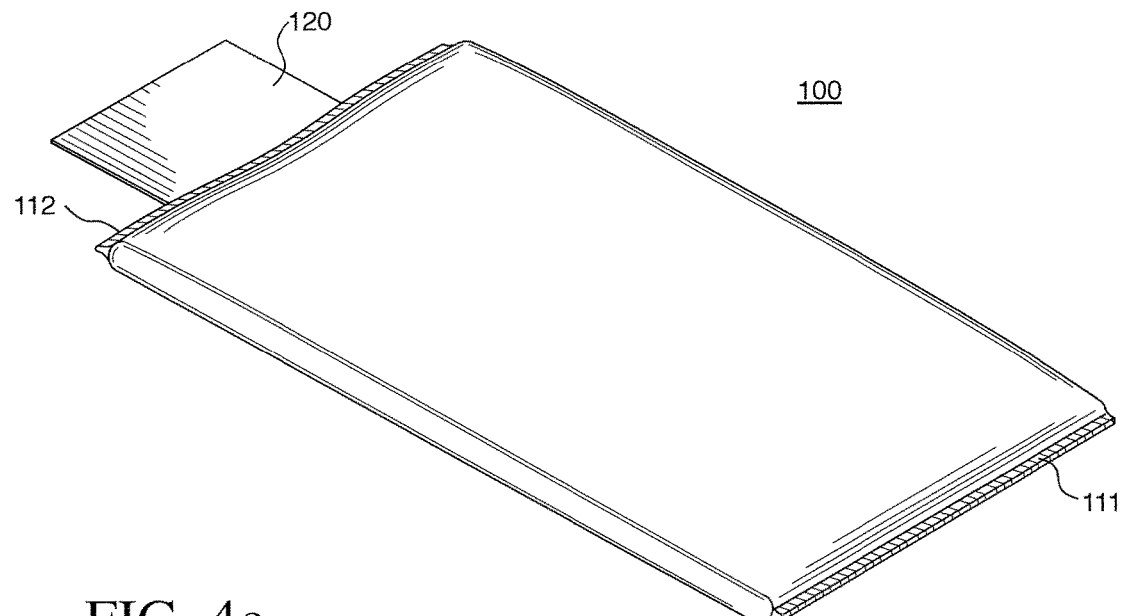
Figure 4D:
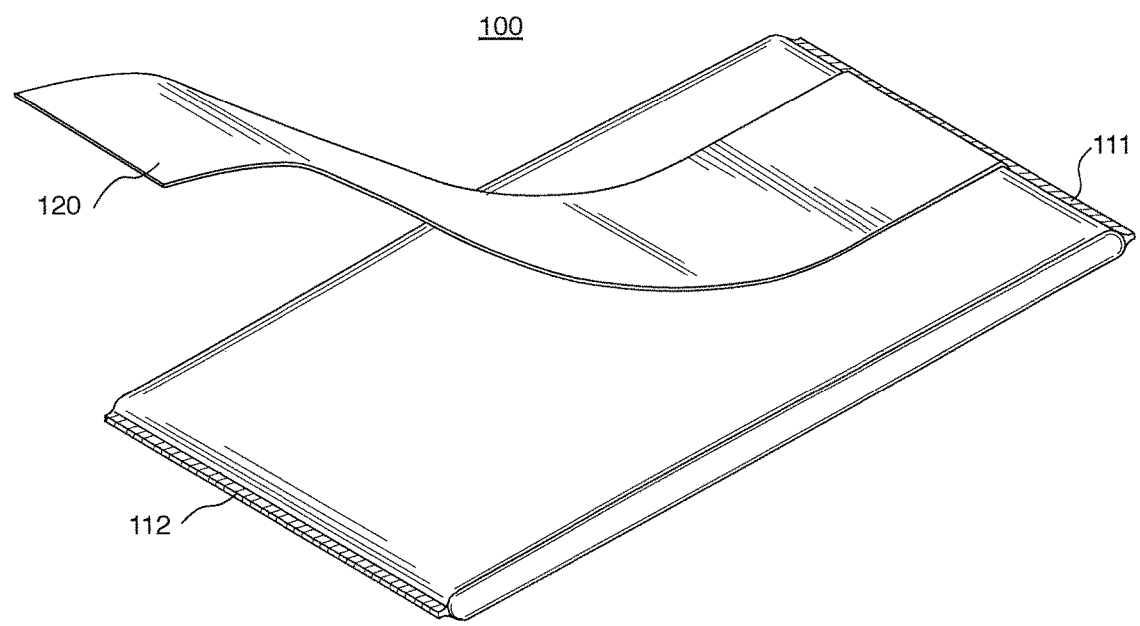
FIG. 4d is a top perspective of the empty flexitank with cape shown in FIG. 4a, with the cape raised for illustrative purposes.

Preferably, the cape 120 is constructed with the same weight and denier as the WPP outer layer, if not made from the exact same material as the WPP outer layer. The cape 120 can be a single piece of material or it can be made from several pieces stitched together so long as they have the strength to pull up the flexible tank during the discharge process. Preferably, the cape 120 is centered along the longitudinal center of the flexible tank and has a width substantially less than the width of the flexible tank. FIGS. 4a-4d illustrate the basic geometry of the cape in relation to the rest of the flexitank when empty. FIG. 4d shows that only one end is attached to the flexitank and the cape 120 can be lifted up as desired, such as to attach it to the discharge equipment shown in FIGS. 5 and 6a-6f. (There may be a valve in the top of the flexitank, but it is not shown in FIG. 4d.)

Figure 5:
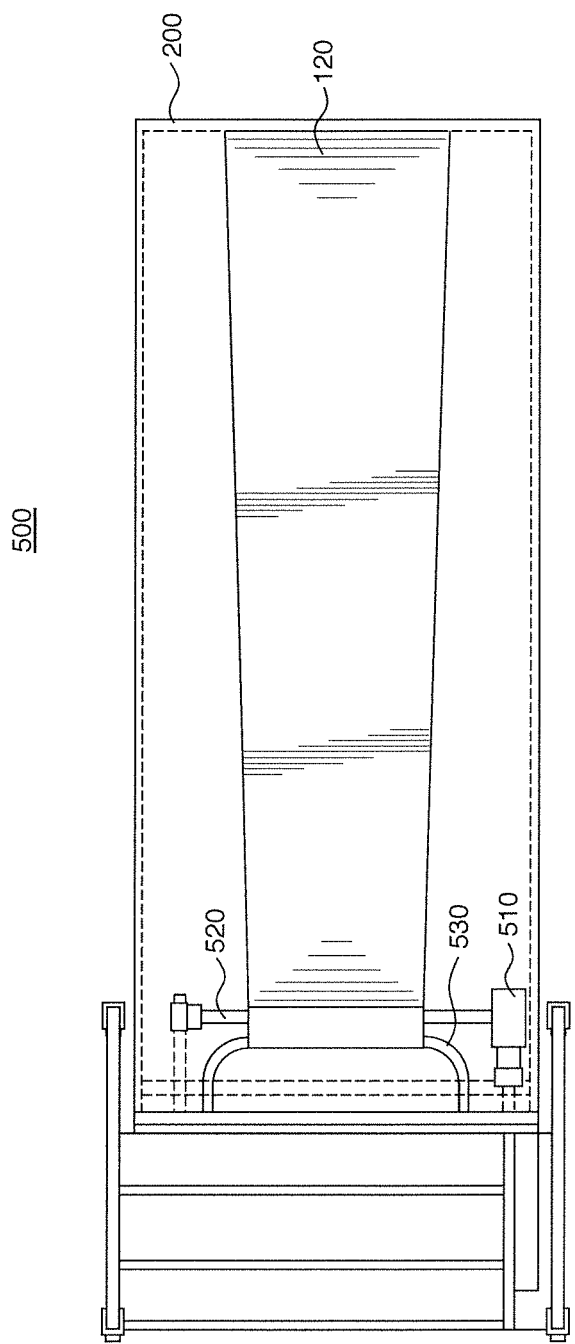
FIG. 5 is a top view of the discharge apparatus for extracting liquid from a flexitank with cape inside a container according to a preferred embodiment of the invention.

The overall width of the cape 120 is an important consideration. It is preferably not so narrow that it has insufficient strength to operate as desired with a large volume of product in the flexible tank. It should not be so wide that there is difficulty winding up the cape during the discharge process described herein. Different widths are shown in FIGS. 1-3 than in FIGS. 4a-4d, and than in FIG. 5. For standardized containers, the optimal width is approximately in the range of between 72 to 92 inches centered on the tank. The length of cape 120 generally depends on the size of the container. Preferably, it is about eight feet longer than the container and hangs over the bulkhead. For a flexible tank in a 20 foot container, the cape is 28 feet long. The cape 120 is preferably rectangular, but its shape may vary. For example, it may be tapered and be slightly wider at the end attached to flexitank 100 than at the other end, as shown in FIG. 5.

While a single cape 120 is preferred, there can be variations. There may be two capes spaced apart, but symmetrically about the center of the flexible tank. There may be other material such as ropes, cords, links, belts, nylon attached to the flexible tank that can be used to assist in the discharge process. Such alternative, although likely inferior, embodiments may be employed where a flexible tank has already been manufactured without a cape, but it is most desirable to use an extraction platform described herein. Any number of flexible tank embodiments other than the illustrated preferred flexible tank embodiments are possible and will work with the extractor platform.

Despite previous efforts, the efficient and productive discharge of product from a flexitank heretofore remained difficult to achieve, especially with liquids of a low viscosity. The extractor cape 120 addresses this problem and works best if it is not pulled by hand or by ropes, etc. An important aspect of the subject invention pairs discharge equipment 300 with the novel flexitank 100 with cape 120. It substantially reduces the human labor needed to discharge a flexitank by using the cape 120 to pull and lift the end of the flexible tank 100 opposite the discharge valve 130, thereby moving the products inside the flexible tank 100 to the end with the discharge valve 130. The flexible tank may also have a heavy duty square plate of polyethylene inside the inner layer of the flexible tank and above the discharge valve opening. This plate has the effect of maintaining product flow and reduces the risk of any material of construction of the flexible tank being sucked into the discharge hose. The discharge valve 130 is preferably centralized at the end of the container to work in conjunction with the extraction equipment. It may be located at dead center, in which case both doors have to be opened to access the discharge valve, or it may be slightly offset from center by a distance just enough so that only one door needs to be opened. But locations to the side should be avoided since the extraction equipment works better when the discharge valve is centrally located.

In a preferred embodiment, a discharge platform 500 is used in conjunction with a preferred embodiment of the flexible tank 100 with cape 120 inside a standardized multi-modal international shipping container as shown in FIGS. 5 and 6a-6f to discharge the bulk product inside the flexible tank 100. The discharge platform 500 is dimensioned to be positioned around a trailer 600 and at the rear of the container 200 when both container doors are completely opened. The platform provides a flat horizontal surface that is off the ground at the approximate height of the floor of container 200 when it is loaded on a trailer. There is preferably a service/access step 540 above the horizontal surface that an operator can stand on to better reach inside the container if and when desired during the process of discharging liquids from the flexitank 100. As best seen in FIG. 7, the discharge platform 500 has an access ladder with a hand railing for an operator to get to the horizontal surface and service/access step 540, and a safety cage 550 protecting the operator. There may also be a screen, cover, tarp, roof, enclosure, etc., to further protect the operator from sun, rain or other weather elements during the discharge process.

The discharge platform 500 is preferably on casters for easier movement and maneuvering and is optimally constructed of various materials appropriate for both safety and performance. Since multi-modal shipping containers are standardized in size, guidance wings or other fitting parts can be located and angled so as to aid in aligning the discharge platform 500 around the container 200 (which is typically on top of a trailer 600 as shown in FIGS. 6a-6f) and into the rear opening of container 200. The casters or other parts are preferably height adjustable to compensate for uneven surfaces, and/or different heights, and can be locked into place once the discharge platform 500 is in position. Although shipping containers 200 are standardized, the flexitank 100 and container 200 are usually on a tractor-trailer when it is desired to discharge the flexitank 100 and the height presented by trailers may vary significantly.

As shown in FIGS. 5 and 6a-6f, discharge platform 500 has a take-up bar 510, and a high torque gearbox and drive motor 520 with an associated power inverter and speed controller (not shown). Preferably, the motor 520 may have a switch or be otherwise selectable to utilize standard electrical power from either a common industrial 110 VAC receptacle through a 20 amp circuit or a high duty battery, as may be desired for any particular flexitank discharge. The motor 520 can be operated by a person while standing on discharge platform 500 outside of the container.

The take up bar 520 is supported in two slotted hubs (not shown), one of which is driven by the motor, which releasably retain the bar during the method of discharging product. The take up bar 510 and slotted hubs extends significantly from the discharge platform past the bulkhead 130 into the space of the container. The supports for take up bar 510 and slotted hubs must be especially strong because of the distance that the take up bar is extended and the forces that take up bar 520 experiences when it winds up the flexitank 100. Cape 120 preferably has an attachment point and take up bar 520 has an attachment mechanism or adaptation so that cape 120 can be secured to or within take up bar 520 without any slippage. Other methods, such as industrial tape, may also be employed.

A stripping and positioning bar 530 is located below take up bar 520 and closer horizontally to the bulkhead 130 than take up bar. It is at least as wide as the cape 120, but not as wide as the take-up bar. It is U-shaped or D-shaped as shown to control the horizontal position (and generally keep centered) of first, cape 120, and then, flexitank, 100 as they are passed to and wound up on take up bar 520. Although FIGS. 6a-6d show the flexitank 100 as laying flat on the floor of the container while the cape 120 is wound up, at some point, the entire length (such as 28 feet) of the cape 120 has been wound up and the flexitank 100 itself begins to pass over the stripping and positioning bar 530 at an angle. The high pulling forces from take up bar 520 are then additionally translated into compressive forces that have the effect of squeezing or stripping away any residual product from the inside of the flexible tank 100. It is preferred that stripping and positioning bar 530 has a very smooth and low friction surface so it is preferably coated, such as with a Teflon® coating available from Dupont Corporation of Wilmington, De, or the equivalent. There may be additional bars, or there may be rollers additionally provided, to further assist in positioning the cape and flexible tank or stripping residual material from inside of the flexible tank.

Figure 6A:
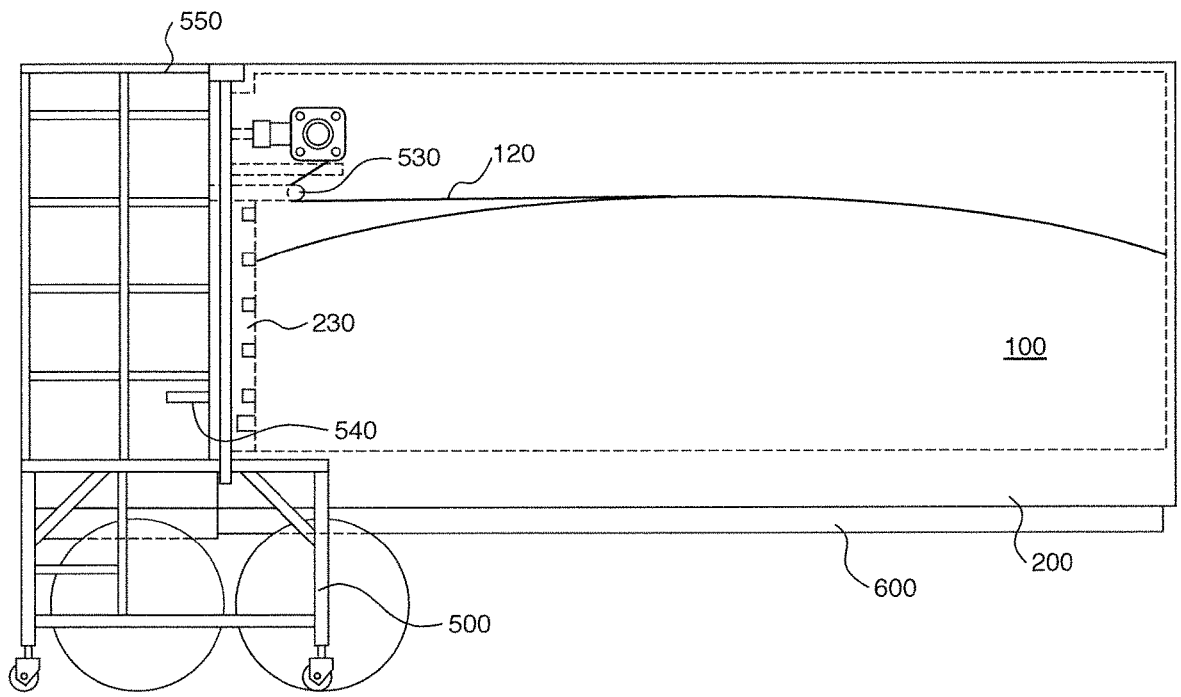
FIG. 6a is a side view of the discharge apparatus shown in FIG. 5 at the beginning of the method for extracting liquid from the flexitank with cape.
Figure 6B:
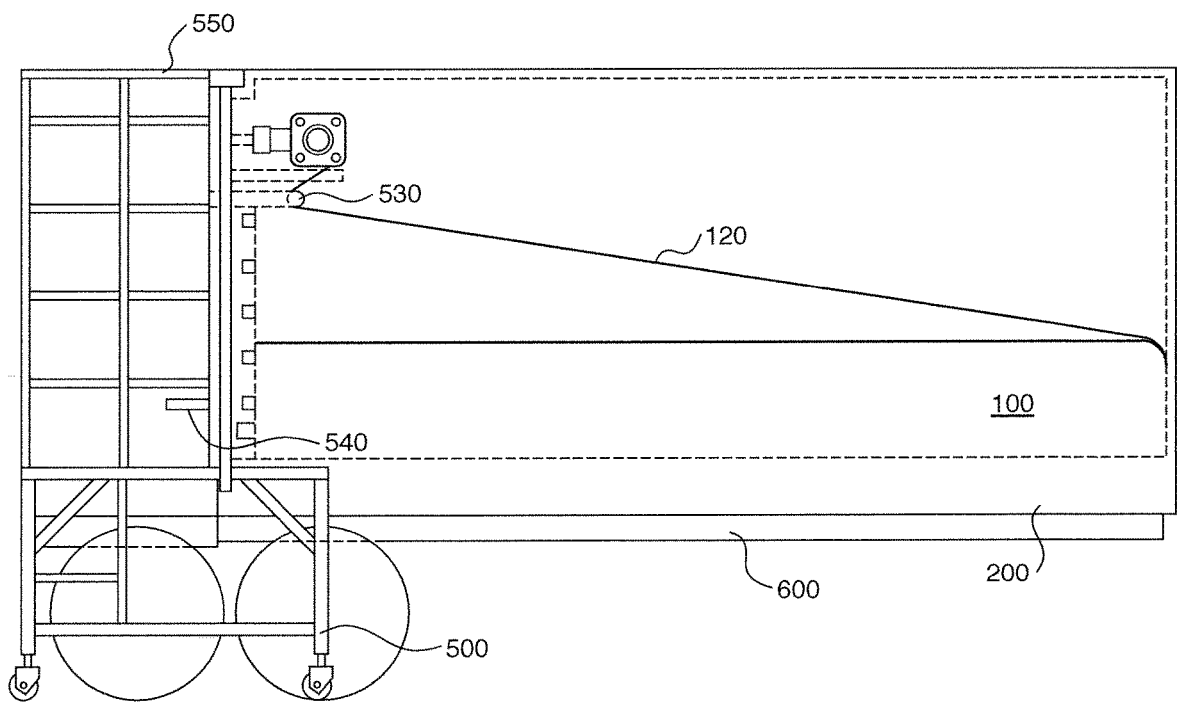
FIG. 6b is a side view of the discharge apparatus shown in FIG. 5 at the moment in time when the liquid has been partially extracted and the flexitank with cape is still supported by the rear wall of the container.
Figure 6C:
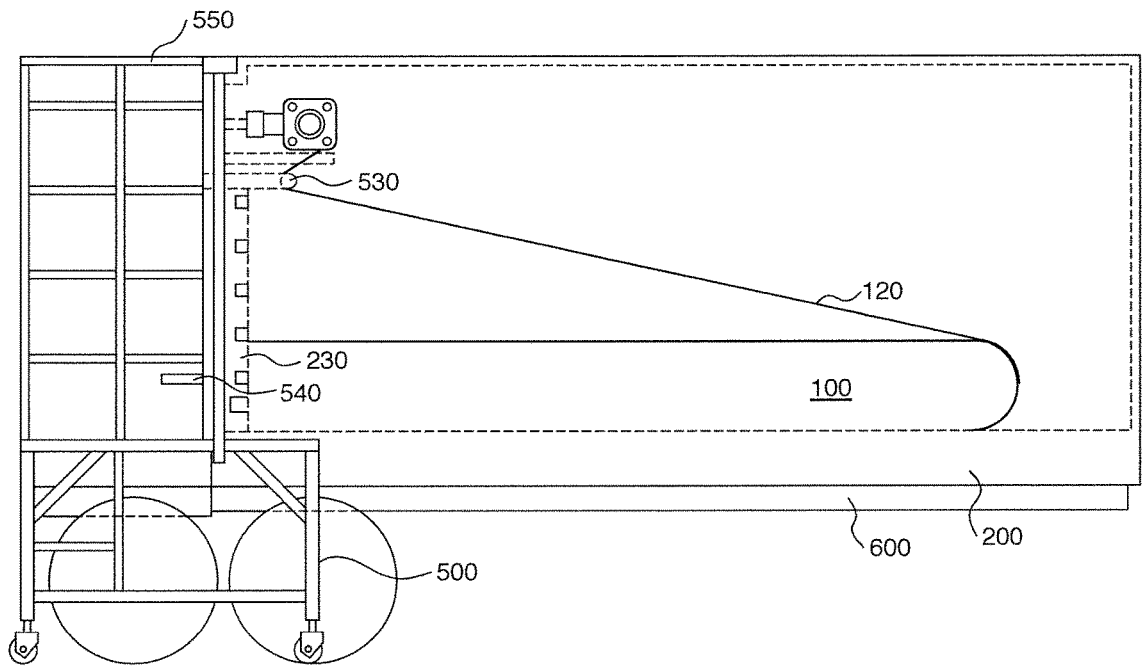
FIG. 6c is a side view of the discharge apparatus shown in FIG. 5 at a moment in time when the flexitank with cape has been pulled away from the rear wall of the container.
Figure 6D:
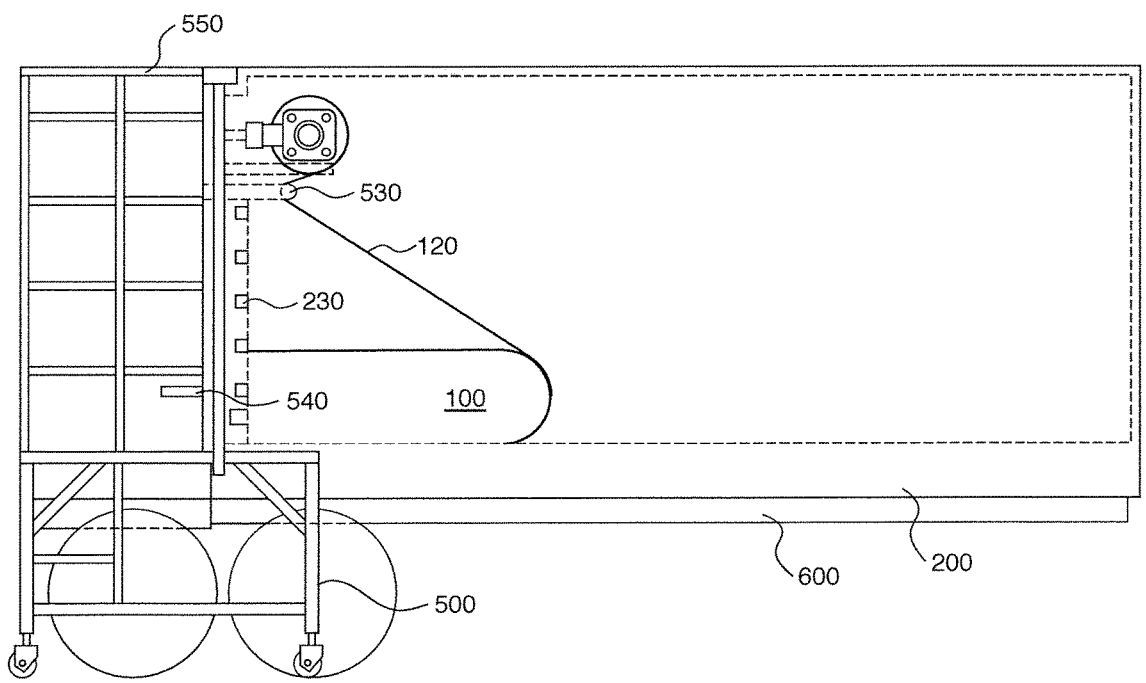
FIG. 6d is a side view of the discharge apparatus shown in FIG. 5 at a moment in time when the flexitank with cape has been nearly emptied.
Figure 7:
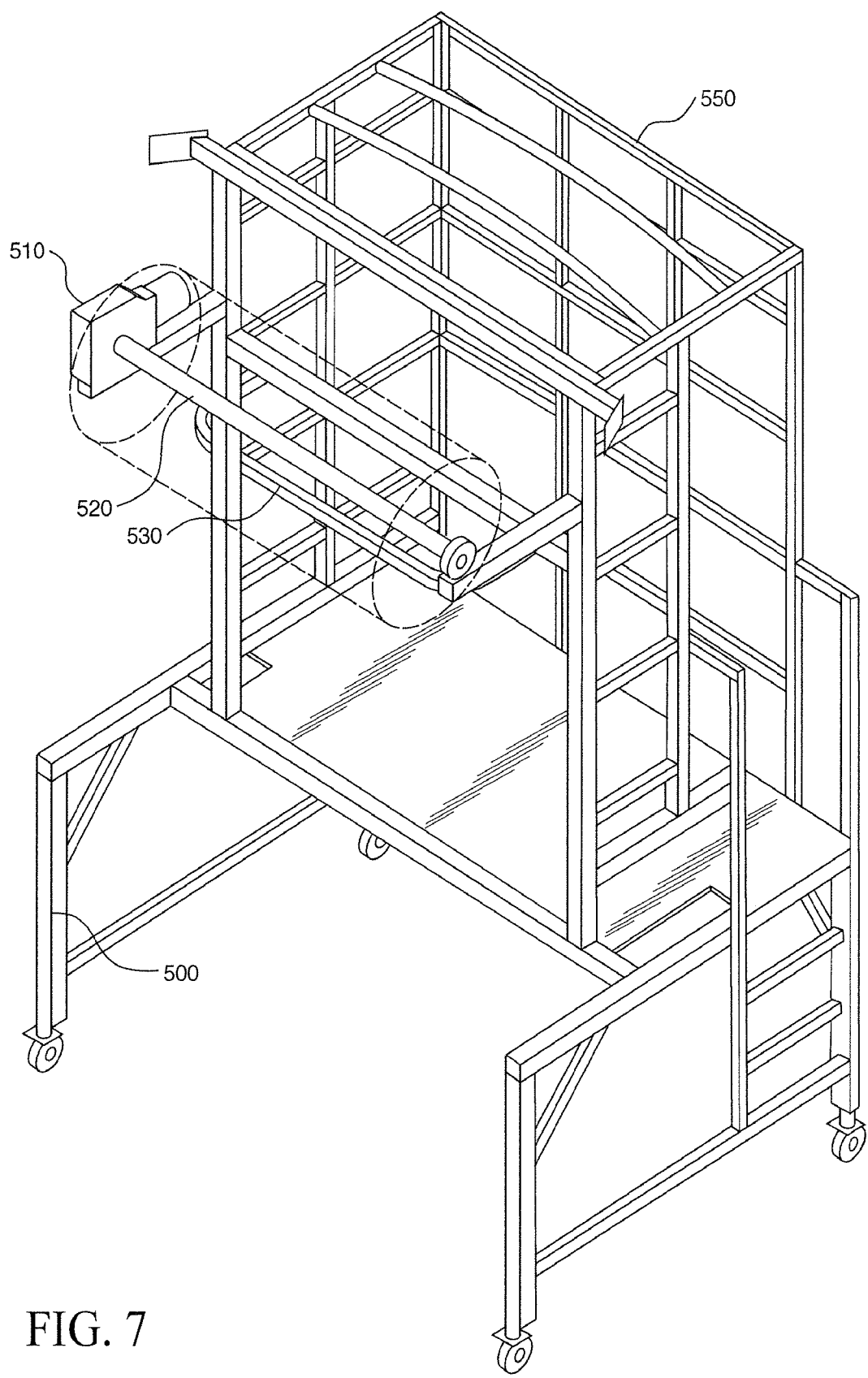
FIG. 7 is a perspective view of the discharge apparatus shown in FIG. 5 separately from the flexitank, cape and shipping container.

When ready to discharge, the cape 120 is passed over the stripping & positioning bar 530 and attached to the discharge take up bar 520 as shown in FIG. 6a. Using the motor 510, excess material of the cape 120 is wound around the discharge take up bar 520 until tension is achieved in the cape 120. At his point the bottom mounted discharge valve 130 on the flexible tank 100 is opened and the pump is started, beginning the discharge.

When the flexible tank 100 has been partially discharged, preferably at approximately fifty percent discharged (see FIG. 6b), the motor 510 is activated and the discharge take up bar 520 commences winding up the cape 120. This process will steadily continue (see FIGS. 6c and 6d) to the point where the rear of the flexible tank 100 is pulled completely forward and lifted up and over the stripping & positioning bar 530 (see FIG. 6e). The stripping and positioning bar is configured to reduce the width of the flexible tank 100 thus allowing it to wrap around the take up bar 520 and at the same time "squeezing" the flexible tank 100 and forcing product to drop to the bottom reservoir gathering behind the discharge valve 130. This reservoir allows and maintains a free flow of product through the valve 130 and together with other flexible tank modification, which prevents the flexible tank film from being sucked into the discharge hose.

The rear corners of the flexible tank 100 may be supported by two cords which are long enough to be held by a person on discharge platform 500. These cords may be used to hold up both sides of the flexible tank 100 when the discharge is almost completed and allows product to run from the corners of the flexible tank 100 to the reservoir behind valve 130. The flexible tank 100 continues to be wound around the take up bar 520 until it is completely lifted from the container floor.

Figure 6E:
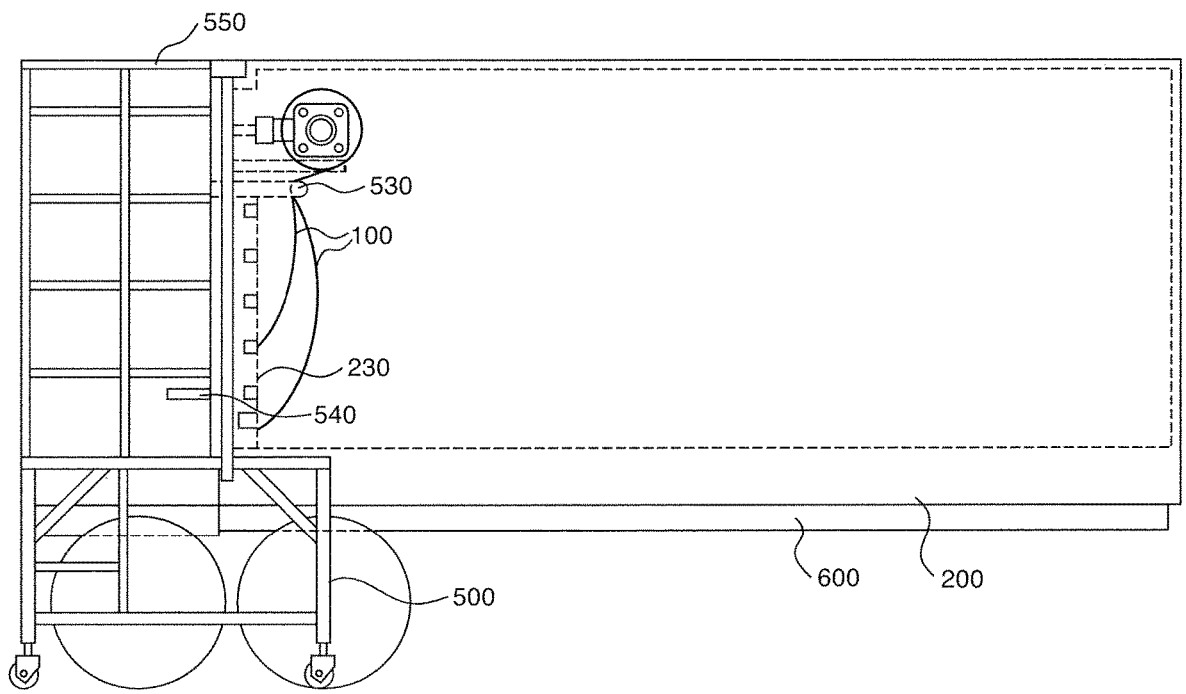
FIG. 6e is a side view of the discharge apparatus shown in FIG. 5 at a moment in time when the flexitank with cape is substantially empty and is supported by the discharge apparatus.

FIG. 6e shows flexible tank 100 passing over the stripping & positioning bar and winding around the discharge take-up bar at a relatively late time in the extraction process. At this point, the discharge valve 130 of flexitank 100 is released and unsecured from the bulkhead 230. The valve 130 is suspended in air and any remaining product drops into the discharge hose thus achieving a complete unload of the flexible tank. The valve 130 is then closed and the hose disconnected from it. Any cords holding the flexible tank corners are cut and the flexible tank 100 is completely wound around the take up bar 520.

Figure 6F:
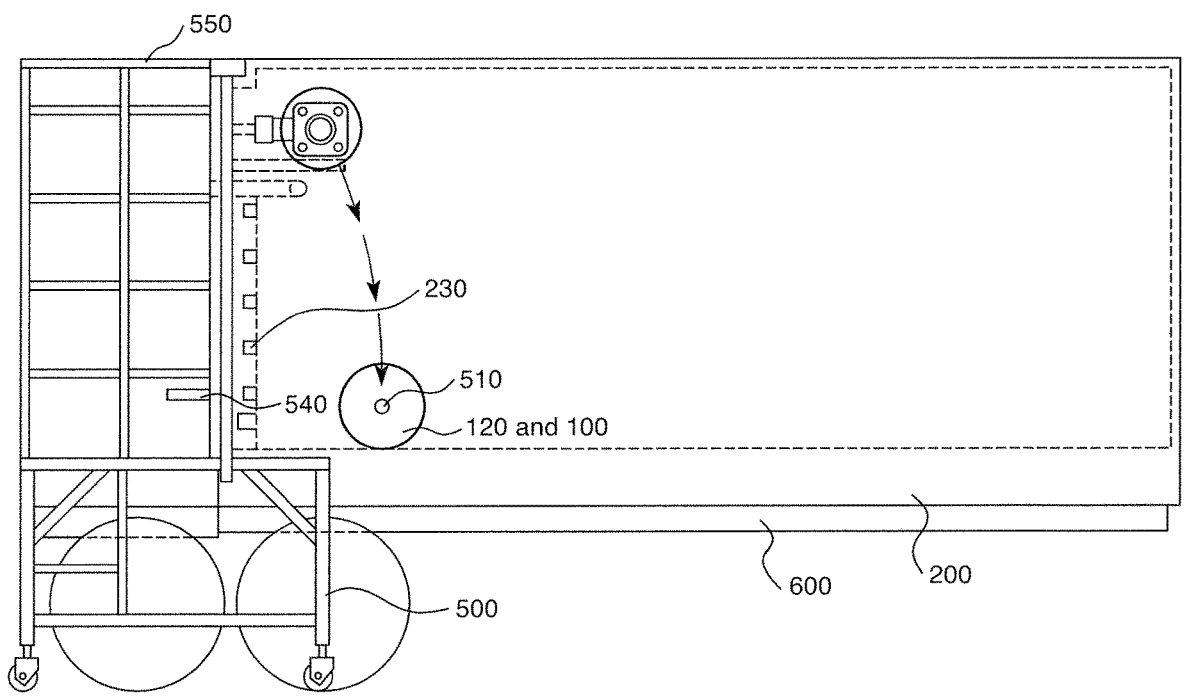
FIG. 6f is a side view of the discharge apparatus shown in FIG. 5 according to a preferred embodiment where the rolled-up flexitank with cape is dropped into the empty container.

The take up bar 520 is then released from the hubs, and it and the flexitank 100 wound up on it, disengage from the hubs and fall to the floor of the container as shown in FIG. 6f. Any unlocking mechanism can be employed, but preferably there is a push button release or equivalent that can be operated by the operator while standing on the discharge platform 500 outside the container 200. There may be locking pins or other mechanism that may be removed, and then the hubs rotated through operation of the motor so that the take up bar freely discharges itself by gravity and falls into the container. Alternatively, the discharge platform 500 can be removed from container 200 with flexitank 100 still on the take up bar 520. The flexitank 100 and cape 120 are preferably disposable and/or recyclable, and are not intended to be reused. In either case, the product is more or less fully discharged from flexitank 100 with no residue left behind. The discharge method carried out in less time with less labor necessary.

The invention claimed is:

1. A flexible tank for transporting bulk liquids or semi-liquid materials in a rectangular shipping container, comprising:
    at least one inner layer made of a flexible water-proof polymeric material, said at least one inner layer having first and second ends;
    an outer shell made of a flexible polymeric material and forming an interior, said at least one inner layer positioned inside said interior of said outer shell, said outer shell having first and second ends;
    a discharge valve extending through said outer shell and said at least one inner layer, said discharge valve being located near said first end of said at least one inner layer and said first end of said at least one outer shell; and
    at least one cape having a length greater than a greatest width of the cape, first and second sides equal to the length of the cape, and first and second ends along the width of the cape, said first end attached to said outer shell at or near the second end of said outer shell and a second end that is not attached to any part of the flexible tank.

2. The flexible tank of claim 1, wherein at least said second end of said at least one inner layer has a coupon and a seam is formed from said coupon and the second end of said outer shell, and said at least one cape is incorporated and sewn into the seam.

3. The flexible tank of claim 1, having only one cape, wherein said one cape is rectangular in shape, centered along the longitudinal center of the outer shell, and has a constant width less than the width of said outer shell.

4. The flexible tank of claim 3, wherein said one cape has a constant width between 72 to 92 inches.

5. The flexible tank of claim 1, having only one cape, wherein said one cape is wider at said first end that is attached to said outer shell than said one cape is at the second end.

6. The flexible tank of claim 1, wherein said at least one cape has a length greater than the length of said outer shell.

7. The flexible tank of claim 6, wherein said outer shell is slightly greater than 20 feet long and said at least one cape is approximately 28 feet long.

8. An apparatus for discharging bulk liquids or semi-liquid materials from a flexible tank having a cape located inside a shipping container, comprising:
    a platform with a flat horizontal surface at an approximate height of the floor of said shipping container for an operator to stand upon;
    a take-up bar to which said cape of said flexible tank is attached during discharging, the take-up bar being positioned inside the shipping container when the apparatus is positioned at the opening of said shipping container;
    a motor to drivably rotate the take-up bar; and
    a stripping and positioning bar, the stripping and positioning bar being located below the take-up bar and closer to the opening of the shipping container than said take-up bar,
    wherein the cape and the flexible tank are pulled to and wound upon the take-up bar when the cape is attached to the take-up bar and the take-up bar is rotated by operation of said motor.

9. The apparatus of claim 8, wherein the stripping and positioning bar has a low friction surface and, when the flexible tank is pulled to and wound upon the take-up bar, the flexible tank is pulled over the stripping and positioning bar at an angle causing any residual material inside the flexible tank to be stripped from inside surfaces of the flexible tank.

10. The apparatus of claim 9, wherein the stripping and positioning bar has a width that is less than the width of the take-up bar, the stripping and positioning bar is U-shaped or D-shaped and, when the cape and flexible tank are pulled to the take-up bar, the stripping and positioning bar horizontally positions the cape and the flexible tank.

11. The apparatus of claim 9, wherein the motor driving the take-up bar can be controlled by an operator while standing on the platform outside of the shipping container.

12. The apparatus of claim 9, wherein the take-up bar can be remotely released to fall inside the container by an operator standing on the platform outside of the container.

13. The apparatus of claim 9, wherein the apparatus has a service/access step above the flat horizontal surface of the platform to facilitate accessing to the inside of the container.

14. The apparatus of claim 9, wherein the apparatus can be moved horizontally and has guide elements to assisting in aligning the apparatus with the opening of the shipping container.

15. The apparatus of claim 14, where in the height of the apparatus or the platform can be adjusted.

16. A method for discharging bulk liquids or semi-liquid materials from a flexible tank inside a shipping container, comprising:
    attaching a cape to a rear end of a flexible tank opposite the front end of the flexible tank having a discharge valve at an opening of the shipping container;
    positioning a discharge apparatus with a take-up bar and a stripping and positioning bar, both of the take-up bar and stripping and positioning bar being located inside the shipping container above the flexible tank when the apparatus is positioned at the opening of said shipping container;
    attaching the cape to the take-up bar such that the cape goes around a portion of the stripping and positioning bar as the cape is being pulled towards the take-up bar;
    drivably rotating the take-up bar to pull the cape and the flexible tank from the rear end of the shipping container, thereby urging the complete discharge of said bulk liquids or semi-liquid materials out the discharge valve of the flexible tank; and
    winding the cape and the depleted flexible tank around the take-up bar.

17. The method of claim 16, wherein the discharge apparatus has a platform with a flat horizontal surface at an approximate height of a floor of said shipping container for an operator to stand upon, and the method can be carried out by the operator while standing on the flat horizontal surface outside of the shipping container.

18. The method of claim 16, wherein the stripping and positioning bar has a width that is less than the width of the take-up bar, the stripping and positioning bar is U-shaped or D-shaped and, when the cape and flexible tank are pulled to the take-up bar, the stripping and positioning bar horizontally positions the cape and the flexible tank.

19. The method of claim 16, wherein the stripping and positioning bar has a low friction surface and, when the flexible tank is pulled to and wound upon the take-up bar, the flexible tank is pulled over the stripping and positioning bar at an angle causing any residual material inside the flexible tank to be stripped from inside surfaces of the flexible tank.

20. The method of claim 16, further comprising releasing the take-up bar from the discharge apparatus such that the take-up bar and the cape and flexible tank fall to a floor of the shipping container.

\* \* \* \* \*